W. DYER.
ATTACHMENT FOR MOWING MACHINES.
APPLICATION FILED AUG. 30, 1920.

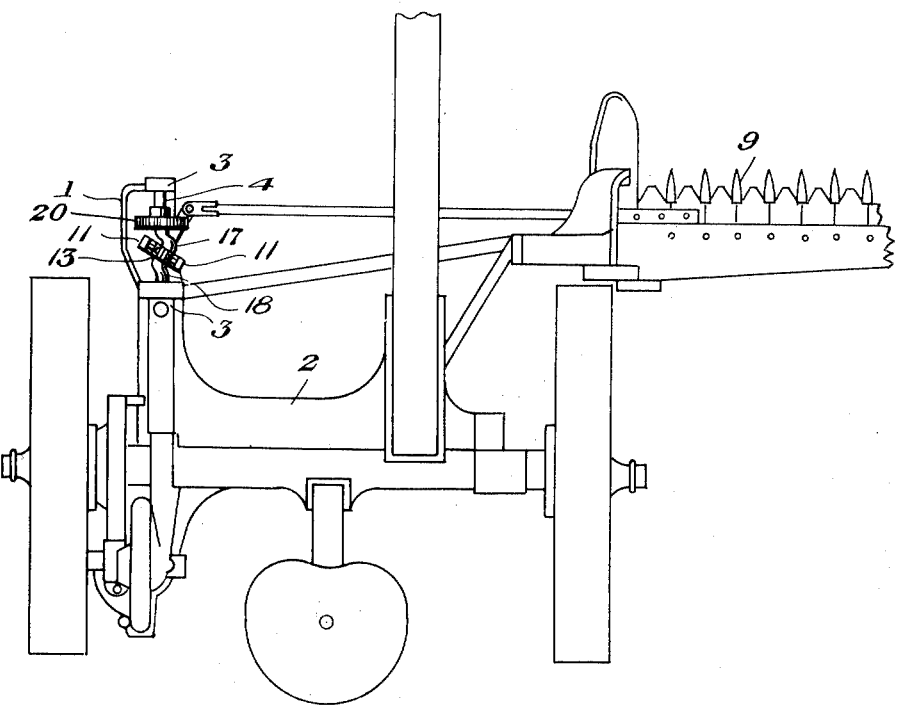
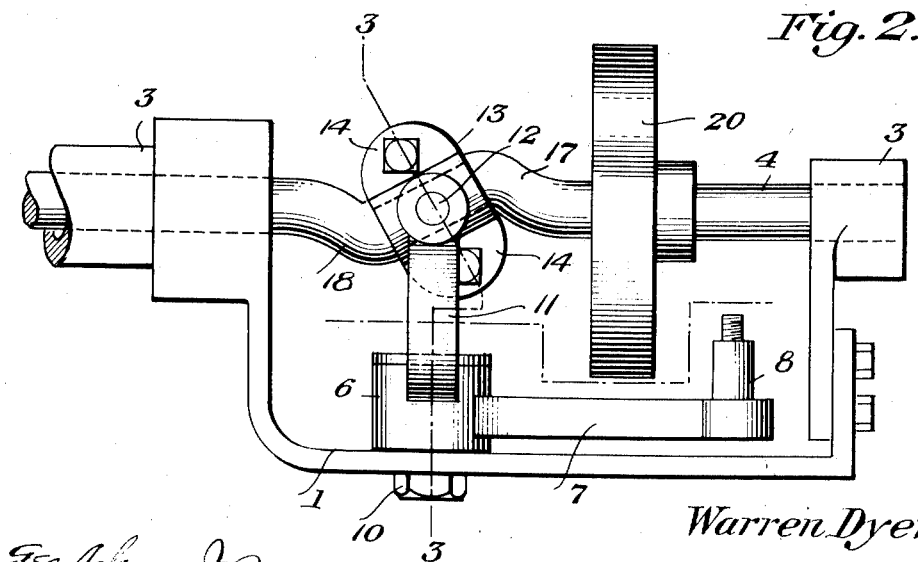

1,390,890.

Patented Sept. 13, 1921.
2 SHEETS—SHEET 2.

Warren Dyer
INVENTOR

BY Victor J. Evans
ATTORNEY

WITNESS:

UNITED STATES PATENT OFFICE.

WARREN DYER, OF MANGUM, OKLAHOMA.

ATTACHMENT FOR MOWING-MACHINES.

1,390,890.      Specification of Letters Patent.    Patented Sept. 13, 1921.

Application filed August 30, 1920. Serial No. 406,823.

*To all whom it may concern:*

Be it known that I, WARREN DYER, a citizen of the United States, residing at Mangum, in the county of Greer and State of Oklahoma, have invented new and useful Improvements in Attachments for Mowing-Machines, of which the following is a specification.

My present invention has reference to a mechanical movement whereby a reciprocatory movement is imparted to a member by a revolving element.

The improvement is primarily, but not necessarily, restricted to use in connection with mowing machines, and has for its object to produce a means for imparting a reciprocatory movement to the sickle bar which will permit of the same moving in a steadier manner and which will insure a more positive and powerful stroke than the devices ordinarily employed for this purpose.

A further object is the production of a mechanical movement wherein a reciprocatory movement is imparted to an element by a revolving member, in which the parts are of a simple construction which may be cheaply manufactured and easily applied, and furthermore wherein the parts are not liable to breakage or disorder.

The foregoing objects, and others which will appear as the nature of the invention is better understood, may be accomplished by a construction, combination and operative arrangement of parts, such as is illustrated by the drawings.

In the drawings:—

Figure 1 is a plan view of the improvement.

Fig. 2 is a side elevation thereof.

Figure 3:
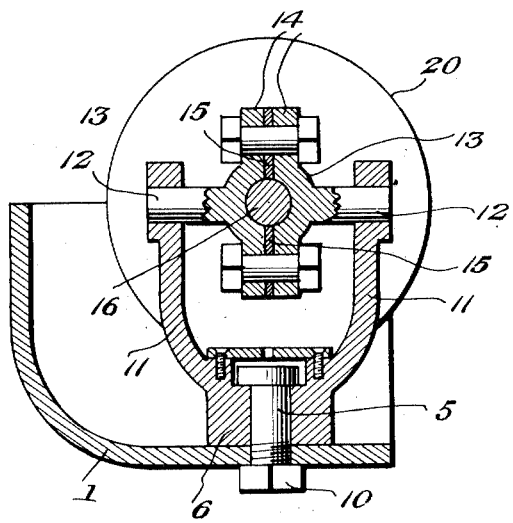
Fig. 3 is a sectional view approximately on the line 3—3 of Fig. 2.
Figure 4:
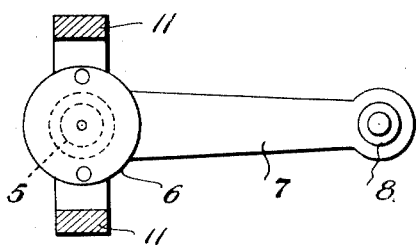
Fig. 4 is a sectional view approximately on the line 3—3 of Fig. 2.
Figure 5:
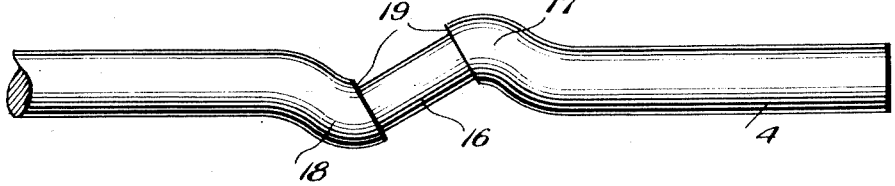
Fig. 5 is a plan view of the crank shaft.

In the dust pan 1, of a moving machine 2, a fragmentary portion of which is disclosed by the drawings, there is mounted in bearings 3 a shaft 4 which is revolved in the usual manner when the machine is in motion. On the base of the dust pan, between the bearings 3 there is journaled, in a suitable opening therein, a stub shaft 5. The stub shaft extends from a head 6 that is provided with a longitudinally extending finger 7, the same having at its outer end an outstanding stud 8 to which the sickle bar 9 is attached. The stub shaft 5 preferably has its outer end threaded and is engaged by a nut 10. On the head 6 are oppositely disposed upwardly extending arms 11. These arms are arranged right angularly with respect to the finger 7. The arms 11 have their outer ends provided with alining round openings that form bearings for trunnions 12 on the mating sections of a bearing member 13. The member 13 preferably has its central portion enlarged outwardly and has a central round opening therethrough. Each of the sections constituting the bearing are of similar construction, and from the said rounded portions are extended to provide what may be termed ears and which are designated by the numeral 14. Through these ears also are passed the securing elements which are preferably in the nature of short bolts, which are engaged by nuts, and also preferably these securing elements compress flexible plates 15 between the ears, so that the bore of the bearing will be held out of contact with the angularly reduced portion 16 of the shaft 4. The shaft is inclined in opposite directions, as indicated by the numerals 17 and 18, respectively, from the angle portion 16, and the shoulders 19 formed at the ends of the said angle portion 16 limit the longitudinal movement of the bearing on the said portion of the shaft. The shaft, at its straight end, inward of the inclined portion 18 has secured thereon a fly wheel 20.

The shaft 4 having the angle portion 16 which is engaged by the bearing member 13, and which latter has its trunnions 12 connected to the arms of the swiveled head member 6 causing the latter, incident to the varying angular positions assumed by the bearing upon the rotation of the shaft, to impart an oscillatory movement to the head member and the finger 7 carried thereby. This movement is positive, that is a firm stroke is imparted by the shaft to the bearing and from the bearing to the oscillatory head. The shaft can be revolved at a comparatively low rate of speed, but the finger 7 is rapidly reciprocated, and it is thought that the foregoing description, when taken in connection with the drawings, will fully set forth the construction and advantages of the improvement.

Having thus described the invention, what I claim, is:—

1. A revoluble shaft which is journaled in bearings and which has a reduced angle portion between the bearings, and inclined portions between the straight and angle portions, a two-part bearing removably secured to the angle portion of the shaft, connecting means for the sectional bearing, compressible plates between the sections, a member including a head having a stub shaft which is journaled below the bearing, upstanding arms on the head, trunnions on the bearings journaled in openings in the arms, a longitudinal finger on the head disposed centrally between the arms thereof, and an upstanding lug on the end of the finger.

In testimony whereof I affix my signature.

WARREN DYER.